United States Patent [19]

Bleys

[11] Patent Number: 5,489,620
[45] Date of Patent: Feb. 6, 1996

[54] PROCESS FOR MAKING FLEXIBLE FOAMS

[75] Inventor: Gerhard J. Bleys, Heverlee, Belgium

[73] Assignee: Imperial Chemical Industries PLC, London, England

[21] Appl. No.: 245,937

[22] Filed: May 19, 1994

[30] Foreign Application Priority Data

Jun. 8, 1993 [GB] United Kingdom ............... 9311838

[51] Int. Cl.$^6$ .................................. C08G 18/14
[52] U.S. Cl. ................ 521/159; 521/170; 521/173; 521/174
[58] Field of Search .................. 521/159, 170, 521/173, 174

[56] References Cited

U.S. PATENT DOCUMENTS

| 3,903,232 | 9/1975 | Wood et al. | 264/157 |
|---|---|---|---|
| 4,365,025 | 12/1982 | Murch et al. | 521/159 |
| 4,384,051 | 5/1983 | Guthrie | 521/137 |
| 4,451,588 | 5/1984 | Speranza | 521/174 |
| 4,668,708 | 5/1987 | Mueller et al. | 521/159 |
| 5,059,633 | 10/1991 | Wood et al. | 521/160 |
| 5,063,253 | 11/1991 | Gansen et al. | 521/159 |
| 5,270,348 | 12/1993 | Muller et al. | 521/159 |
| 5,314,928 | 5/1994 | Verhelst | 521/159 |
| 5,369,138 | 11/1994 | Gansen | 521/159 |
| 5,397,811 | 3/1995 | Lunardon et al. | 521/159 |
| 5,418,259 | 5/1995 | Broos et al. | 521/159 |
| 5,418,261 | 5/1995 | Meisemans et al. | 521/159 |

FOREIGN PATENT DOCUMENTS

| 0380993 | 8/1990 | European Pat. Off. . |
|---|---|---|
| 0433878 | 6/1991 | European Pat. Off. . |

Primary Examiner—James J. Seidleck
Assistant Examiner—John M. Cooney, Jr.

[57] ABSTRACT

A method for the preparation of flexible polyurethane foams by reacting a prepolymer having an NCO value of 5–10% by weight which is the reaction product obtained by reacting an excessive amount of a polyisocyanate containing at least 85% by weight of 4,4'-diphenylmethane diisocyanate or a variant thereof with a polyol having an average nominal hydroxyl functionality of from 2.5 to 3.5, an average hydroxyl equivalent weight of from 1000 to 3000, and an oxyethylene content of from 50 to 85% by weight with water, the amount of water being at least 20 parts by weight per 100 parts by weight of prepolymer.

7 Claims, No Drawings

PROCESS FOR MAKING FLEXIBLE FOAMS

The manufacture of polyurethane flexible foams by reacting organic polyisocyanates such as tolylene diisocyanate (TDI) or diphenylmethane diisocyanate (MDI) with polyether polyols in conjunction with a foaming agent is well established. The polyethers are usually polyoxypropylene polyols derived from propylene oxide or poly(oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates.

Polyols having higher oxyethylene contents, for example 50% or more on a weight basis, are often employed as minor additives to ensure that the foams have an open-cell structure. The use of these polyethers at very high concentrations in conjunction with the usual isocyanates is not possible because then, instead of having a cell-opening effect, they result in closed cell foam.

It has now been found that flexible foam having valuable properties can be successfully made from formulations containing high concentrations of polyols having high oxyethytene contents if substantially pure 4,4'-MDI or a derivative thereof is employed as the polyisocyanate.

Thus according to the invention, there is provided a method for the preparation of flexible polyurethane foams by reacting a prepolymer having an NCO value of 5–10% by weight which is the reaction product obtained by reacting an excessive amount of a polyisocyanate containing at least 85 preferably at least 90 and more preferably at least 95% by weight of 4,4'-diphenylmethane diisocyanate or a variant thereof with a polyol having an average nominal hydroxyl functionality of from 2.5 to 3.5, an average hydroxyl equivalent weight of from 1000 to 3000, and an oxyethylene content of from 50 to 85% by weight with water, the amount of water being at least 20 parts by weight per 100 parts by weight of prepolymer.

The polyisocyanate component used in the method of the invention may consist essentially of pure 4,4'-diphenylmethane diisocyanate or mixtures of that diisocyanate with one or more other organic polyisocyanates, especially other diphenylmethane diisocyanate isomers, for example the 2,4'-isomer optionally in conjunction with the 2,2'-isomer. The polyisocyanate component may also be an MDI variant derived from a polyisocyanate composition containing at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting such a composition with one or more polyols. Preferably the polyisocyanate has a functionality of 2.05 or less and most preferably of 2.00 and most preferably is 4,4'-MDI.

In order to obtain an average nominal hydroxyl functionality of 2.5 to 3.5 a polyol having a nominal hydroxyl functionality of 3 may be used or a mixture of polyols having an average nominal hydroxyl functionality of 2–6 provided the mixture is in the above 2.5–3.5 functionality range.

The polyol is a polyoxyalkylene polyol, preferably a poly(oxyethylene-oxypropylene) polyol, having the required functionality, equivalent weight and oxyethylene content. Such polyols are known in the art and may be obtained in conventional manner by reacting ethylene and propylene oxides simultaneously and/or sequentially in any order with an initiator such as water, a polyol, a hydroxylamine, a polyamine and the like having from 2 to 6 active hydrogen atoms or mixtures of such initiators.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation. It is preferred that the average nominal hydroxyl functionality of the polyol composition is 3. The number average equivalent weight preferably is 1000–2000. Most preferred polyols have nominal hydroxyl functionality of 3 and an average hydroxyl equivalent weight of from 1200–1600.

If desired, the polyoxyalkylene polyol (or one or more of the polyoxyalkylene polyols when a mixture of such is used) may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in the polyoxyalkylene polyol.

The prepolymer is prepared conventionally by reacting the polyisocyanate and the polyol at relative amounts so as to obtain an NCO value of 5–10% by weight at a temperature preferably between 40° and 80° C. The prepolymers so prepared are liquid at ambient conditions. To the prepolymer so prepared low amounts (up to 30% by weight) of MDI or a variant thereof may be added provided the 4,4'-MDI content remains above 85% by weight calculated on all polyisocyanate used and provided the average isocyanate functionality of the added polyisocyanate is less than 2.2.

The prepolymer preferably has a viscosity of at most 10.000 mPa.s at 25° C.

The prepolymer is reacted with water, the amount of water being at least 20, preferably 20–500, most preferably 25–400, parts by weight per 100 parts by weight of prepolymer.

The foam-forming reaction mixture may contain one or more of the additives used in preparing flexible foams. Such additives include catalysts, for example tertiary amines and tin compounds, surface-active agents and foam stabilisers, for example siloxane-oxyalkylene copolymers and oxyethylene/oxypropylene copolymers, chain extenders, for example low molecular weight diols or diamines, cross-linking agents, for example triethanolamine, fertilizers, flame retardants, organic and inorganic fillers, pigments, agents for suppressing the so-called boiling-foam effect like polydimethylsiloxanes and internal mould release agents. However, valuable flexible foams may be obtained without any of these additives. Preferably no additives are applied except up to 5 parts by weight per 100 parts by weight of prepolymer of foam stabilizer. Most preferably no additives are employed. If used, such additives preferably are premixed with the water.

This reaction system is used for making flexible foams, having good properties, in a very simple way. Surprisingly the prepolymers have a low viscosity which improves ease of handling and processing when making flexible foams which have a desirable colour (white), have open cells or are easy crushable and can have compression set values (ASTM D 3574–77, Test D, dry 50%) below 20% in particular when no surfactant is used. The purity and simplicity of the chemicals used for making the prepolymers ensures that flexible foams made thereof have a minimum of leachable substances which make these foams especially useful in areas where contact with a human body is required like in medical and hygienic applications.

The foams may be produced in the form of slabstock, mouldings and the like and may be used for vibration damping, diapers, sponges, wound dressings, tampons and the like.

The invention is illustrated but not limited by the following Examples in which all parts, percentages and ratios are by weight.

The following glossary of materials is included to identify reaction components not otherwise identified in the Examples.

GLOSSARY

A2580 is Arcol 2580, a polyether triol having random oxyethylene and oxypropylene residues with a 77% oxyethylene content and a molecular weight of about 4000, commercially available from Arco.

TABLE 1

| | Example | | |
|---|---|---|---|
| | 1 | 2 | 3 |
| Prepolymer | 100 | 100 | 90 |
| Polyisocyanate 1/ Polyisocyanate 2 (1:1/w:w) | — | — | 10 |
| DC 193 | — | — | 0.1 |
| water | 300 | 50 | 25 |

The foams had fine cells and a clear, white colour. The foam obtained in example 3 had a density of 55 kg/m$^3$ (ISO 1855); a compression load deflection (40%) of 4.1 kPa (ISO 3386) and a hysteresis loss of 23% (ISO 3386).

EXAMPLES 4–11

Prepolymers were prepared from polyisocyanates and polyols by mixing them and allowing them to react. Subsequently they were reacted with water (weight ratio prepolymer/water=100/60) in order to prepare a flexible foam. Further details are given in Table 2.

TABLE 2

| | Example | | | | | | | |
|---|---|---|---|---|---|---|---|---|
| | 4 | 5 | 6 | 7 | 8 | 9 | 10 | 11 |
| Isocyanate (parts by weight) | 4,4'-MDI (30) | 4,4'-MDI (30) | 4,4'-MDI (33) | 4,4'-MDI (31.7) | 4,4'-MDI (27.4) | 4,4'-MDI (49) | ISO 1 (30.6) | 4,4'-MDI (17) |
| Polyol (party by weight) | Polyol 1 (70) | Polyol 2 (70) | Polyol 3 (67) | Polyol 4 (68.3) | Polyol 5 (72.6) | A2580 (51) | A2580 (69.4) | A2580 (83) |
| NCO-value of prepolymer, % by weight | impossible to make prepolymer | 7.85 | 7.85 | 7.85 | 7.85 | 14.8 | 7.7 | 3.2 |
| Viscosity of prepolymer mPa · sec. | — | 7200 | 13500 | >50000 too viscous | 3600 | 1300 not stable, MDI precipitates | 14800 | >100000 solid |
| Foam properties | — | acceptable foam | acceptable foam but difficult processing | — | not usable foam, very low tear strength | no foam obtainable | more closed cells, difficult to crush, difficult mixing and processing | no foam obtainable |

Polyol 1: 4000 MW, 100% EO, nominal functionality (f) = 3 polyol.
Polyol 2: 4000 MW, 75% EO-tip, f = 3, EO/PO polyol
Polyol 3: 2500 MW, 75% EO random, f = 3, EO/PO polyol.
Polyol 4: 4000 MW, 75% EO random, f = 4, EO/PO polyol.
Polyol 5: 4000 MW, 75% EO random, f = 2, EO/PO polyol.
Iso 1: 63/37 (w/w) blend of 4,4'-MDI/polymeric MDI (f = 2.20 of blend)

Arcol is a trade mark of Arco.

Polyisocyanate 1 is a uretonimine-modified 4,4'-MDI having an NCO content of 29.3% and a functionality of 2.12.

Polyisocyanate 2: comprising about 80% by weight of 4,4'-MDI and having a functionality of 2.01.

DC-193 is a silicone surfactant obtainable from DOW Corning.

EXAMPLES 1–3

A prepolymer was prepared by reacting 70 parts by weight of A 2580 and 30 parts by weight of 4,4-MDI. From this prepolymer a flexible foam was prepared by reacting it with the ingredients indicated in Table 1. The prepolymer had an NCO value of 7.85% by weight and a viscosity of 6000 mPa.s

EXAMPLE 12

The prepolymer prepared in example 1 was reacted with water (weight ratio prepolymer/water=100/70). The foam obtained was a white flexible foam having a density of 100 kg/m$^3$, and a compression set (ASTM D 3574–77, Test D, dry 50%) of 12% and was easily crushable.

I claim:

1. A method for the preparation of flexible polyurethane foams by reacting a prepolymer having an NCO value of 5–10% by weight which is the reaction product obtained by reacting an excessive amount of a polyisocyanate containing at least 85% by weight of 4,4'-diphenylmethane diisocyanate or a variant thereof with a polyol having an average nominal hydroxyl functionality of from 2.5 to 3.5, an average hydroxyl equivalent weight of from 1000 to 3000, and an oxyethylene content of from 50 to 85% by weight with water, the amount of water being at least 20 parts by weight per 100 parts by weight of prepolymer.

2. A method according to claim 1 wherein the poly(oxyethylene-oxyalkylene) polyol is a poly(oxyethylene-oxypropylene) polyol.

3. A method according to claims 1 wherein the polyol has a nominal hydroxyl functionality of 3 and an average hydroxyl equivalent weight of from 1200–1600.

4. A method according to claims 1 wherein the polyisocyanate contains at least 90% by weight of 4,4'-diphenylmethane diisocyanate.

5. A method according to claims 1 wherein the polyisocyanate contains at least 95% by weight of 4,4'-diphenylmethane diisocyanate.

6. A method according to claim 1 wherein the polyisocyanate has a functionality of at most 2.05.

7. A method according to claim 1 wherein the prepolymer has a viscosity of at most 10.000 mPa.s at 25° C.

* * * * *